United States Patent [19]

Spencer

[11] E Re. 29,524

[45] Reissued Jan. 24, 1978

[54] POROUS LAMINATE AND METHOD OF MANUFACTURE

[75] Inventor: Andrew R. Spencer, Bloomfield Hills, Mich.

[73] Assignee: Facet Enterprises, Inc., Tulsa, Okla.

[21] Appl. No.: 713,089

[22] Filed: Aug. 9, 1976

Related U.S. Patent Documents

Reissue of:

[64] Patent No.: 3,900,629
Issued: Aug. 19, 1975
Appl. No.: 397,467
Filed: Sept. 14, 1973

[51] Int. Cl.[2] ..... B32B 3/10; B32B 15/00; B01D 25/22

[52] U.S. Cl. ..... 428/134; 29/163.5 R; 29/163.5 F; 156/252; 156/263; 156/629; 156/634; 156/644; 156/656; 428/138; 428/304; 428/596

[58] Field of Search ..... 29/163.5 R, 163.5 F, 29/191.4; 156/257, 252, 263, 264, 268, 3, 8, 18; 428/131, 132, 134, 136, 138, 304, 212

[56] References Cited

U.S. PATENT DOCUMENTS

| | | | |
|---|---|---|---|
| 691,804 | 1/1902 | Parker | 161/109 |
| 2,166,366 | 7/1939 | Norris | 204/6 |
| 2,687,278 | 8/1954 | Smith et al. | 29/163.5 R |
| 2,870,700 | 1/1959 | Harrington | 161/112 X |
| 3,024,147 | 3/1962 | Brooks et al. | 156/252 X |
| 3,123,446 | 3/1964 | Wheeler | 29/183 |
| 3,286,784 | 11/1966 | Mariner | 428/304 X |
| 3,303,085 | 2/1967 | Price et al. | 156/644 X |
| 3,530,032 | 9/1970 | Ragir | 161/113 |
| 3,546,075 | 12/1970 | Sheetz et al. | 29/163.5 R |
| 3,628,720 | 12/1971 | Schmedding | 161;428/112 X;138 X |
| 3,669,791 | 6/1972 | Bridgeford | 156/252 X |
| 3,677,844 | 7/1972 | Fleischer et al. | 161/109 X |
| 3,770,532 | 11/1973 | Bean et al. | 156/644 X |
| 3,802,972 | 4/1974 | Fleischer et al. | 428/131 X |
| 3,811,999 | 5/1974 | Fleischer et al. | 428/131 |
| 3,989,867 | 11/1976 | Sisson | 428/132 |

FOREIGN PATENT DOCUMENTS

| | | | |
|---|---|---|---|
| 845,184 | 8/1960 | United Kingdom | 428/134 |

*Primary Examiner*—Harold Ansher
*Attorney, Agent, or Firm*—Remy J. VanOphem

[57] ABSTRACT

A porous laminate is disclosed consisting of a plurality of lamina each having a parallel slot series formed therein, stacked with the respective adjacent slot series overlapping and extending transversely to each other and bonded to each other to form the porous laminate. Variations disclosed include tapering the slots in one or more of the lamina to create a variable porosity and the inclusion of tying sections at intermediate points along the slots for reinforcement purposes.

The disclosed process includes the steps of photoetching metal sheets to create the slot pattern, stacking a plurality of the sheets together with the slots in adjacent sheets extending transversely to each other, diffusion bonding the stacked sheets to form a porous laminate, and calendering the finished sheet to modify or adjust permeability.

8 Claims, 5 Drawing Figures

Fig-5
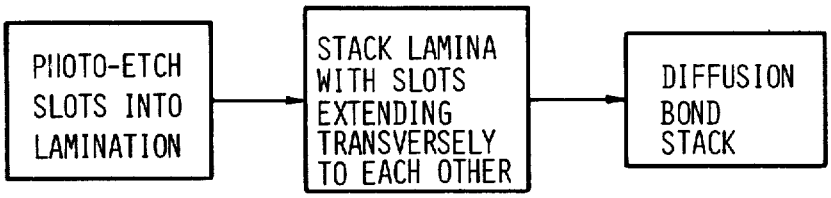
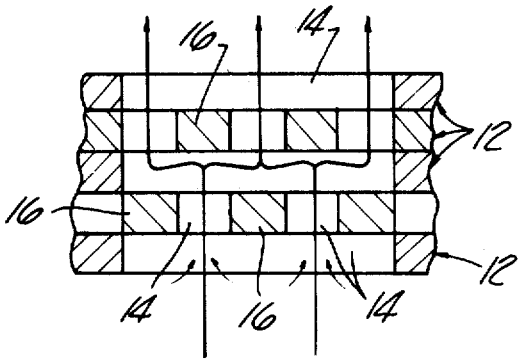
Fig-2
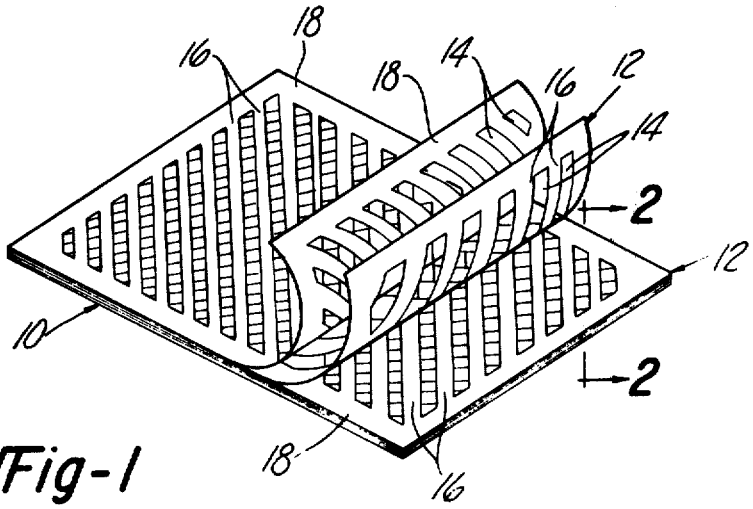
Fig-1

POROUS LAMINATE AND METHOD OF MANUFACTURE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention concerns porous materials and methods of manufacture thereof.

2. Description of the Prior Art

Certain filtering and turbine cooling applications have required a multilayer porous material in which the openings therein can be fairly closely controlled both laterally across the width of the layer and also through the entire thickness of the material so that the overall permeability of the material to fluid flow can be precisely controlled.

A prior art approach to satisfying this requirement is described in U.S. Pat. No. 2,857,657 involving cros winding of successive layers of flattened metal wire onto a mandrel and diffusion bonding of the layers together. While more effective than the relatively imprecise method of simply stacking and bonding layers of wire mesh together, certain drawbacks are nonetheless also inherent with this approach:

- High cost of the small diameter wires usually used.
- Nonuniformity of wire diameter (affects porosity).
- Waste selvage that must be trimmed from the ends of each cylinder (often 10 to 20 per cent).
- Periodic cross-over points where porosity is nonuniform.
- Need for specialized winding machines.
- Lengthy calculation procedure needed for each wind pattern.
- Compromises in wind pattern due to machine limitations.
- Limited sizes of sheets producible with present equipment.
- Wind pattern varies slightly in each successive layer as the winding radius increases.

Another disadvantage is encountered in incorporating such materials into complete structures such as turbine parts, as these materials must often be welded and such wound materials have proven difficult to weld and the resulting welds sometimes produce frayed windings and surface subsidence.

Turbine applications also have created a need for a variable porosity material, i.e., a material in which its permeability differs in different regions of the same sheet. While the above-described method can be utilized to produce this characteristic, it is difficult and lacking in allowing a reasonable latitude of design flexibility.

Accordingly, it is an object of the present invention to provide an accurately controlled permeability multilayer material in which the aforementioned limitations of a wound material are minimized or eliminated.

SUMMARY OF THE INVENTION

These and other objects which will become apparent upon a reading of the following specification and claims are accomplished by a porous laminate which consists of a plurality of lamina each having a parallel slot series formed therein, stacked with the respective adjacent slot series overlapping and extending transversely to each other, bonded to each other to form the porous laminate. Variations disclosed include tapering the slots in one or more of the lamina to create a variable porosity and the inclusion of tying sections at intermediate points along the slots for reinforcement purposes.

The method of manufacture thereof includes the steps of photoetching metal sheets to create the slot pattern, stacking a plurality of the sheets together, and diffusion bonding the stacked sheets to form a porous laminate, followed by calendering to modify thickness and/or permeability when desired.

DESCRIPTION OF THE DRAWINGS

FIG. 1 is an enlarged perspective view of a laminate according to the present invention with the top two layers peeled back to better illustrate the construction thereof.

FIG. 2 is a view of the section taken along the line 2—2 in FIG. 1.

FIG. 5 is a flow sheet depicting the steps in the method of manufacture of the porous laminate according to the present invention.

DETAILED DESCRIPTION

Figure 4:
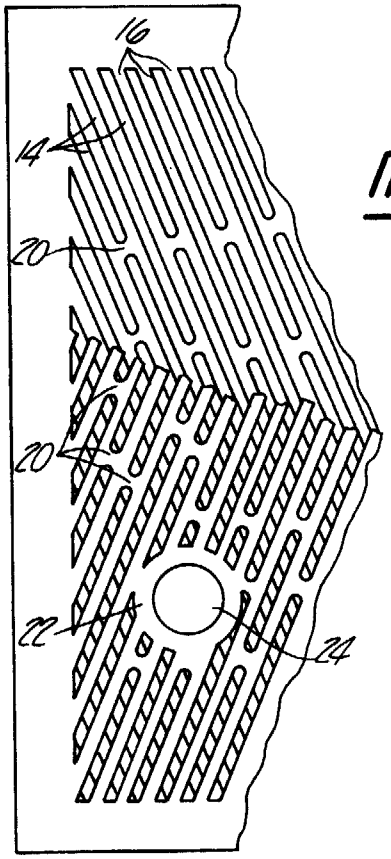
FIGS. 3 and 4 are plan views of porous laminates according to the present invention of alternate forms of construction.

In the following detailed description, certain specific terminology will be utilized for the sake of clarity and a specific embodiment described in order to provide a complete understanding of the invention, but the invention is not so limited and may be practiced in a variety of forms and embodiments.

Referring to the Drawings, and particularly FIG. 1, the porous laminate 10 according to the present invention consists of a plurality of lamina 12, each lamina having a series of uniform width parallel slots 14 and strips 16 formed therein. As shown, the lamina are stacked in intimate contact with each other such that these slots 14 overlap and extend transversely to the slots of each of adjacent lamina. The crossing angle would vary from 15° to 90° for most applications, the area of intersection increasing with decreasing crossing angles to thereby increase the pore opening for a given strip-to-slot ratio.

Each lamina 12 is bounded by solid areas 18 extending about the slot patterns to join the strips 16 and also provide an easily weldable portion thereof since these areas are aligned in the stack such that the laminate 10 has a solid peripheral border.

The lamina 12 are bonded to each other to thus produce the integral laminate 10.

The permeability of the laminate 10 to fluid flow is controlled by the relative size of the open areas formed by the intersection of the crossing slot patterns as well as the thickness and the number of layers making up the laminations.

A typical embodiment utilizes ten layers of 0.002 inch thick 304 stainless steel with a 0.010 inch wide strips and 0.0035 inch slots to yield a 26 per cent porosity. [inch wide strips and 0.0035 inch slots to yield a 26 per cent porosity]

Permeability of the porous lamination can also be affected by providing at least a partial offset in succeeding alternate lamina 12 such that lateral flow occurs in the lamination. A 100% offset is shown in FIG. 2[,]; that is, the strips 16 in alternate layers 12 are not aligned, but rather are aligned with the slots 14 of a preceding alternate layer 12. A lesser offset would exist if the strips 16 were offset to some other degree.

Due to this offset, fluid flow laterally down the transversely extending slots 14 would necessarily occur, and since the cross-sectional area of this flow path would be roughly equal to the cross-sectional area of the slots 14, the permeability would likewise be influenced by this parameter.

In connection with this approach, very low porosity materials having high fluid-to-laminate heat transfer characteristics are possible with configurations wherein the layer thickness is much less than the slot width, the permeability thus being controlled primarily by the layer thickness rather than the slot widths. This is contrasted with wire wound or woven mesh materials when the fabrication processes limit the width to thickness of the filamentary material able to be used.

Figure 3:
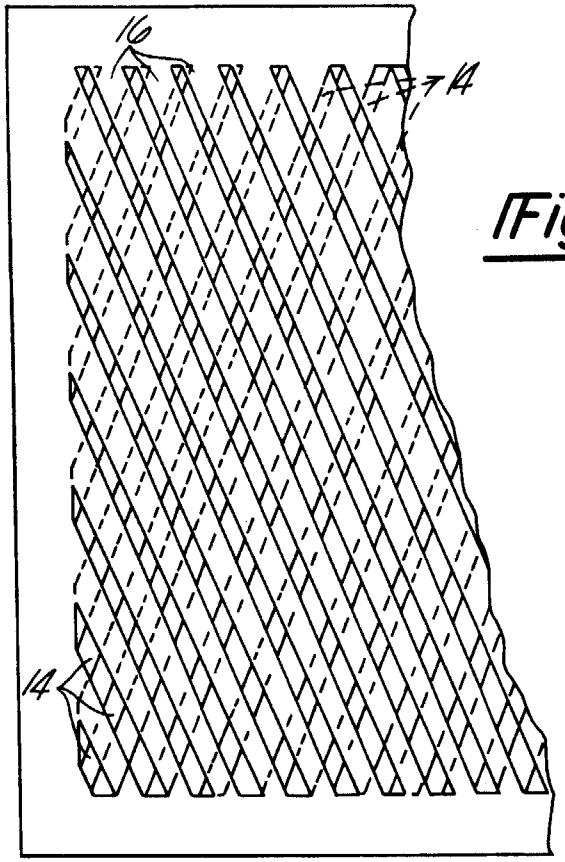

Variations of the basic configuration are shown in FIGS. 3 and 4. The first of these is a variable porosity laminate produced by tapering the slots 14 from one side to the other and stacking the lamina 12 with the larger ends of the tapered slots 14 overlapping the larger so that the slot-to-strip ratio varies across the laminate 10 to thereby produce a variable porosity across the laminate 10. Many other techniques such as stepped slots, etc., would be utilized depending on the requirements of the particular application to obtain such a variably porous material.

For relatively large thin sheets, it may be difficult to handle the individual lamina 12 without damaging them, and for this reason tie sections 20 may be provided as shown in FIG. 4 as a reinforcement to maintain the slot 14 widths. Preferably, these sections 20 will be staggered so as to have a minimal effect on the permeability of the materials, but these sections may be unstaggered for special purposes such as to form localized flow barriers and/or weld strips.

Many other variations are also easily possible by virtue of this approach. For example, it is sometimes necessary to drill holes for various purposes through the porous material. By forming the individual lamina 12 with aligned annular solid areas 22 (FIG. 4) such a through hole 24 is possible without the need for a separate drilling operation, and also passages difficult to form, such as square sections, are easily provided.

The lamina 12 themselves may also differ from one another in pattern, thickness, or material for such purposes as strength, rigidity, flow metering, or to provide transition to other elements or structures.

The preferred method of manufacturing the porous laminated material according to the present invention as desired, includes the step of photoetching the desired slot patterns into the individual lamina. This process involves the coating of one or both sides of the lamina with a resist material in the areas to remain solid. This coating can be done in several ways including silk screen, painting, or by photographic means. This is followed by a chemical etching process which dissolves the uncoated material to thus create the individual lamina. Inasmuch as this process is known to those skilled in this art, it is not felt necessary to set forth herein a complete detailed description thereof. Alternatively, other forming methods could be used in some cases such as precision stamping.

The individual lamina 12 are then stacked with the alternate slot patterns extending transversely to each other, prior to bonding of the stack into an integral laminate. Ordinarily, the degree of precision needed is low, however, for precision alignment, alignment holes can be provided in the borders or on separate breakaway borders.

The preferred technique of bonding is the diffusion bonding process, although alternate processes such as soldering, brazing, welding, or the use of adhesives are possible.

Diffusion bonding requires thorough cleaning of the lamina 12, and may include the application of bonding aids such as copper plating prior to the aforementioned stacking of the individual lamina 12.

Bonding itself takes place with the lamina stack under heat (a typical temperature for stainless steel would be 2,100° F) and pressure in an inert or reducing atmosphere such as dry hydrogen gas to prevent oxidation of the surface.

This process per se is also well known and it is likewise not felt necessary to here include a detailed description of the same for a proper understanding of the present invention.

The laminate 10 may be calendered to provide some adjustment of its permeability and/or thickness. Finally, the resulting assemblage may then be trimmed to the exact size necessary for the particular application as necessary.

From this description it can be appreciated that a porous material has been provided in which the dimensions of the flow passages therein can be precisely controlled throughout the thickness of the material. In addition, this approach offers great design flexibility in providing particular permeability characteristics and incorporation of the material into various structures.

While specific embodiments and methods of manufacture have been described herein, in the interests of clarity, it is of course understood that many alternate constructions and methods of manufacture are possible within the scope of the invention.

For example, successive layers may be oriented with the slots at progressive transverse angles; rather than at alternate angles so that the stiffness is uniform to bending forces applied along any axis.

What is claimed is:

[1. A porous laminate comprising:

a plurality of lamina having slot patterns formed therein, said lamina stacked in intimate contact with each other with said slot patterns of adjacent lamina overlapping and extending transversely to each other to provide intersecting slot patterns, said stacked lamina being bonded to each other to form said laminate, whereby said intersecting slot patterns form fluid flow passages through said laminate.]

[2. The laminate of claim 1 wherein said slot patterns comprise a parallel series of uniform width slots formed in said lamina.]

[3. The laminate of claim 1 wherein said slots formed in said lamina are tapered in the plane of the lamina and said lamina are stacked with the larger end of said slots overlapping, whereby a variable porosity laminate is provided.]

[4. The laminate of claim 1 wherein said slots in said slot patterns have spaced tie sections formed along their lengths.]

[5. The laminate of claim 1 wherein each of said lamina have solid areas formed extending around said slot patterns and wherein said solid areas as aligned in said stack, whereby said laminate is formed with a solid peripheral border.]

[6. The laminate of claim 1 wherein said slots in alternate lamina in said stack extend parallel to each other but are at least partially offset from each other to form lateral flow passages in said laminate.]

[7. A method of manufacturing a porous material comprising:

forming a slot pattern in a plurality of lamina;

stacking said lamina in intimate contact with each other with said slot patterns of adjacent lamina overlapping and extending transversely to each other; and bonding said lamina to each other to form a porous laminate.]

*8. A multilayer porous laminate comprising a plurality of lamina, each lamina having a slot pattern formed therein, wherein each slot pattern comprises a series of slots formed in the corresponding lamina, said slots in a lamina defining axes of orientation parallel therebetween, said lamina being stacked in intimate contact with each other, with said slots of adjacent lamina overlaying in abutting relationship and extending with their respective axes of orientation at an angle to each other to provide intersecting slot patterns, the slots in alternate lamina in said stack having parallel axes of orientation to each other which are at least partially and laterally offset from each other to form lateral flow passages in said laminate, and means bonding said lamina to each other to form said laminate, whereby said intersecting slot patterns form fluid flow passages through said laminate.*

*9. The laminate of claim 8 wherein said slots in said slot patterns have spaced tie sections formed along their lengths.*

*10. The laminate of claim 8 wherein each of said lamina have solid areas formed extending around said slot patterns and wherein said solid areas as aligned in said stack, whereby said laminate is formed with a solid peripheral border.*

*11. A porous filter laminate comprising:*

*a plurality of lamina having slot patterns formed therein, said lamina stacked in intimate contact with each other with said slot patterns of adjacent lamina overlapping and extending transversely to each other to provide intersecting slot patterns, said slots formed in said lamina being tapered in the plane of the lamina and said lamina being stacked with the larger end of said slots overlapping, whereby a variable porosity laminate is provided, the slots in alternate lamina in said stack having parallel axes of orientation to each other which are at least partially and laterally offset from each other, said stacked lamina being bonded to each other to form said laminate, whereby said intersecting slot patterns form fluid passages through said laminate.*

*12. A method of manufacturing a porous material, characterized by the steps of forming a series of slots in a plurality of lamina, said slots in a lamina defining axes of orientation parallel therebetween, stacking said lamina in intimate contact with each other with said slots of adjacent lamina overlaying and extending at an angle to each other, stacking said lamina with slots of alternate lamina having parallel axes of orientation which are laterally offset from each other, and bonding said lamina to each other to form a multilayer porous laminate.*

*13. The method of claim 12 wherein said forming step comprises photoetching said slot pattern in said lamina.*

*14. The method of claim 12 wherein said bonding step comprises diffusion bonding said lamina together to form said laminate.*

*15. The method of claim 14 wherein said forming step comprises photoetching said slot pattern in said lamina.*

* * * * *